United States Patent
Rooholamini et al.

(10) Patent No.: US 7,496,797 B2
(45) Date of Patent: Feb. 24, 2009

(54) ADVANCED SWITCHING LOST PACKET AND EVENT DETECTION AND HANDLING

(75) Inventors: Mo Rooholamini, Gilbert, AZ (US); Randeep Kapoor, Chandler, AZ (US); Ward McQueen, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 580 days.

(21) Appl. No.: 11/096,749

(22) Filed: Mar. 31, 2005

(65) Prior Publication Data

US 2006/0224920 A1 Oct. 5, 2006

(51) Int. Cl.
*G06F 11/00* (2006.01)
(52) U.S. Cl. .................. 714/43; 714/4; 714/51
(58) Field of Classification Search ............ 714/43, 714/4, 51; 370/216–240, 248
See application file for complete search history.

(56) References Cited

U.S. PATENT DOCUMENTS

| | | | | |
|---|---|---|---|---|
| 4,967,344 | A * | 10/1990 | Scavezze et al. ............... 714/4 |
| 5,365,520 | A * | 11/1994 | Wang et al. .................. 370/217 |
| 5,892,895 | A * | 4/1999 | Basavaiah et al. ............. 714/4 |
| 6,674,904 | B1 | 1/2004 | McQueen et al. ........... 382/199 |
| 6,934,749 | B1 * | 8/2005 | Black et al. ................. 709/224 |
| 7,020,696 | B1 * | 3/2006 | Perry et al. ................. 709/223 |
| 7,075,886 | B2 * | 7/2006 | Futernik ..................... 370/216 |
| 7,194,661 | B1 * | 3/2007 | Payson ......................... 714/43 |
| 7,289,434 | B2 * | 10/2007 | Fedorkow et al. .......... 370/219 |
| 2002/0075886 | A1 * | 6/2002 | Tagore-Brage et al. ...... 370/424 |
| 2003/0223416 | A1 * | 12/2003 | Rojas et al. ................. 370/389 |
| 2003/0223435 | A1 * | 12/2003 | Gil ............................... 370/400 |
| 2003/0226085 | A1 * | 12/2003 | Tucker ........................ 714/752 |
| 2004/0001503 | A1 * | 1/2004 | Manter ........................ 370/462 |
| 2004/0083325 | A1 * | 4/2004 | Rabinovitz et al. .......... 710/315 |
| 2005/0132089 | A1 * | 6/2005 | Bodell et al. ................ 709/249 |
| 2005/0251631 | A1 * | 11/2005 | Rowlands et al. ........... 711/145 |
| 2006/0004837 | A1 | 1/2006 | McQueen et al. |

OTHER PUBLICATIONS

InfiniBand Arcitecture Release 1.0a , Jun. 19, 2001, vol. 1 General Specifications.*

RapidIO Interconnect specificaion, Jun. 2002 ,RapidIO Trade Association ,rev. 1.2.*

(Continued)

*Primary Examiner*—Joshua A Lohn
(74) *Attorney, Agent, or Firm*—Marger Johnson & McCollom, P.C.

(57) ABSTRACT

Embodiments of the invention may provide a method to send a packet from an endpoint in an advanced switching fabric and starting a timer to run until receiving a response packet or receiving an event packet notifying of a device failure, save a copy of the sent packet, detect if the timer has expired, retransmit the packet after the timer has expired and resetting the timer; and run a faulty device detection algorithm if the packet has been retransmitted a predetermined number of times. Furthermore, some embodiments may provide an apparatus with a retransmit buffer, and an endpoint that can send a packet and save a copy of the packet in the retransmit buffer, detect if a timer expired and retransmit the packet after the timer has expired and no packet was received in response to the transmitted packet, and run a faulty device detection algorithm.

24 Claims, 8 Drawing Sheets

OTHER PUBLICATIONS

Victor Mensce, Fault tolerance using RapidIO,May 2003 , RTC magazine.*
David Bueno, Simulative Analysis of the RapidIO Embedded Interconnect Architecture for Real-Time, Network-Intensive Applications, Nov. 2004, Local Computer Networks, 2004. 29th Annual IEEE International Conference on Local Computer Network.*
HyterTransport I/O Link Specificaition, published Apr. 27, 2005, HyperTransport technology Consorutim, Revision 2.00b.*
R.Coltun , OSPF For IPv6 , Network working group, Dec. 1999.*

U.S. Appl. No. 10/816,253, filed Mar. 31, 2004, McQueen et al.
U.S. Appl. No. 10/982,132, filed Nov. 5, 2004, Rooholamini et al.
U.S. Appl. No. 11/096,749, filed Mar. 31, 2005, Rooholamini et al.
U.S. Appl. No. 11/097,891, filed Mar. 31, 2005, Kapoor et al.
U.S. Appl. No. 11/097,678, filed Mar. 31, 2005, Rooholamini et al.
U.S. Appl. No. 11/108,988, filed Apr. 18, 2005, Rooholamini et al.
U.S. Appl. No. 11/206,548, filed Aug. 17, 2005, Kapoor et al.
U.S. Appl. No. 11/252,158, filed Oct. 17, 2005, Rooholamini et al.
U.S. Appl. No. 11/241,798, filed Sep. 29, 2005, Rooholamini et al.

* cited by examiner

ADVANCED SWITCHING LOST PACKET AND EVENT DETECTION AND HANDLING

BACKGROUND

Computing technologies continue to evolve. Computing designs are incorporating more functionality, higher processing and transmission speeds, smaller sizes, more memory, etc., into smaller more robust architectures. These trends have placed demands on interconnects and data management at the device level.

A conventional interconnect technology is the peripheral component interconnect (PCI) that was initially developed for chip to chip interconnections. Previous improvements in the PCI architecture to provide greater performance have been to increase data widths and increase reference clock frequencies. For example, data widths increased from 32 bits to 64 bits and the reference clock frequency increased from 33.3 megahertz to 66.6 megahertz. Viewed on a system level, these improvements provided an interconnect with higher performance to meet the increasing performance demands brought on by other computing improvements. As architectures evolved and bottlenecks emerged, interconnect technologies have continually had to adapt to best support processing and communication with peripheral components and functionalities.

Interconnect technology has continued to evolve. The example conventional interconnect approach above, PCI, was updated with PCI Express. The changes from PCI to PCI Express represent general improvement trends in the interconnect space. For example, previous interconnect approaches shared parallel bus implementations that became a hindrance with increased reference clock frequencies. Furthermore, higher bandwidth bus segments restricted the number of loads on each segment to essentially a point-to-point interconnection. An advancement over these interconnect technologies utilizes numerous point-to-point interconnections called links, instead of the parallel bus segments. Links may consist of one or more lanes and each lane in turn generally includes a set of differentially driven pairs of bidirectional signal wires. A reduction in bus size from the shared parallel bus implementations was accompanied by incorporating some control and clocking information into the data stream instead of having separate hardware lines between devices. Adoption of this new functionality has been limited, however, and conventionally includes the integrated reference clock into communicated bit streams, addressing information and limited control information.

Interconnect architecture has received even more functionality and improvements. For example, Advanced Switching Interconnect (ASI), sometimes referred to as advanced switching, extends PCI Express functionality to support direct endpoint to endpoint communications channels via logical paths. This allows concurrent logical interconnects that each connect a specific set of resources. Furthermore, ASI can be separated into fabric specific routing and protocol specific Protocol Interfaces, allowing scaling of an ASI fabric as well as support for various protocols.

In ASI, devices are capable of generating events due to some conditions. Events may indicate errors or may be informative. When a link fails in an ASI fabric, devices attached at the two ends of the link will detect the condition and each will send an ASI defined Event packet to the Fabric Manger (FM) notifying it of the link condition or if one of the devices at the end of a link fails, the device attached to the other end of the link (i.e., the link partner) will send an event to the FM. However, if the event paths go through the link or through the device that failed the event will get lost and the FM will never receive it. Conventional interconnect technologies, even with recent architectural improvements, have no provision for lost events due to condition explained.

BRIEF DESCRIPTION OF THE DRAWINGS

Embodiments of the invention may be best understood by reading the disclosure with reference to the drawings, wherein.

DETAILED DESCRIPTION

In the following description, numerous specific details are set forth. However, it is understood that embodiments of the inventions may be practiced without these specific details. In other instances, well-known circuits, structures, and techniques have not been shown in detail in order to not obscure the understanding of this description.

Reference in the specification to "one embodiment" or "an embodiment", etc., means that a particular feature, structure, or characteristic described in connection with the embodiment is included in at least one aspect of the invention. The appearances of the phrase "in one embodiment" in various places in the specification do not necessarily all refer to the same embodiment.

Generally, embodiments of the present invention may add functionality to interconnect fabrics to help detect, find, and recover from link down events and furthermore determine if these events are hardware or software related. An embodiment may provide an interconnect fabric management solution that addresses lost packet detection and recovery. The present embodiment may further be an advanced switching fabric, for example, one implemented on a fabric of PCI Express interconnect components.

Some embodiments may use a software protocol to allow devices other than switches on either end of a failed link, to become aware of the failure when trying to communicate through it, and to notify a fabric manager of the link or device condition. That is, when a device attempts to communicate through or with a failed link or device, it may receive a return to sender port down event from the switch attached to the failed link or device. Some embodiments may not only stop communicating through that failed path, but also may notify a fabric manager of the return to sender port down event it received. The present embodiment may notify the fabric manager with a user defined protocol interface (PI) packet. If the fabric manager is already aware of the condition it may ignore the packet, otherwise it may run an event handling process or algorithm. An embodiment may allow a FM to become aware of a link or device failure even when the events generated by devices attached to the failed link or device get lost due to the event paths going through the failed link or device.

Devices use a pre determined path, assigned by a fabric manager, to send events to the fabric manager. However, if the path goes through a link or a device which has just failed, the event will silently be dropped from the fabric and the fabric manager will never become aware of the condition. Some embodiments may use a simple yet powerful protocol to account for lost events due to the scenario described here, by allowing a fabric manager to become aware of the link failure through some other mechanisms.

Figure 1:
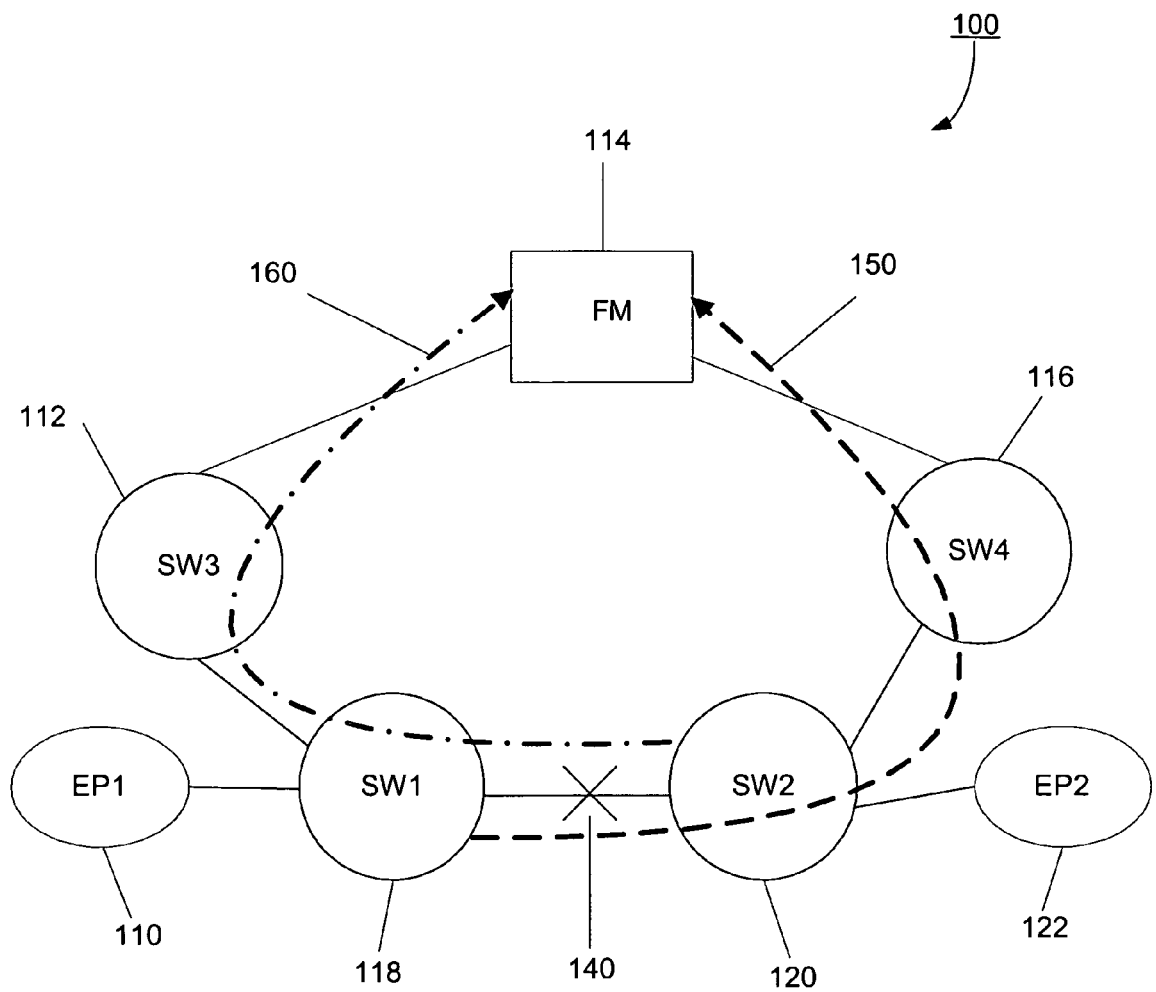
FIG. 1 illustrates an interconnect fabric with a link down between two switches and where the switches notification path to a fabric manager are each over the down link.

FIG. 1 illustrates an embodiment including an interconnect fabric 100 with a link down 140 between two switches and where the switches notification path to a fabric manager are each over the down link. In an embodiment, the interconnect fabric 100 may be an advanced switching (AS) fabric. Referring to FIG. 1, endpoint 110 is connected with switch 118 and may send or receive data or control information from switch 118. Switch is connected to switch 112 and switch 120 through links. In one embodiment a link may be a physical interconnect between two point to point connected components. According to the illustration, switch 112 may be connected to a specialized endpoint called a fabric manager 114 which in turn may also be connected to switch 116. Furthermore, switch 116 may be connected to switch 120 which is further connected to endpoint 122.

FIG. 1 illustrates an embodiment comprising an event path 150, from switch 118 to the fabric manager 114, that includes failed link 140 and further includes an event path 160, from switch 120 to the fabric manager 114, that also includes failed link 140. In this scenario, since the event path to the fabric manager 114 for each switch on either end of the failed link 140 actually includes the failed link 140, the fabric manager 114 will not be notified by switch 118 and switch 120 about the failed link 140 over their event paths 150 and 160 respectively.

Figure 2:
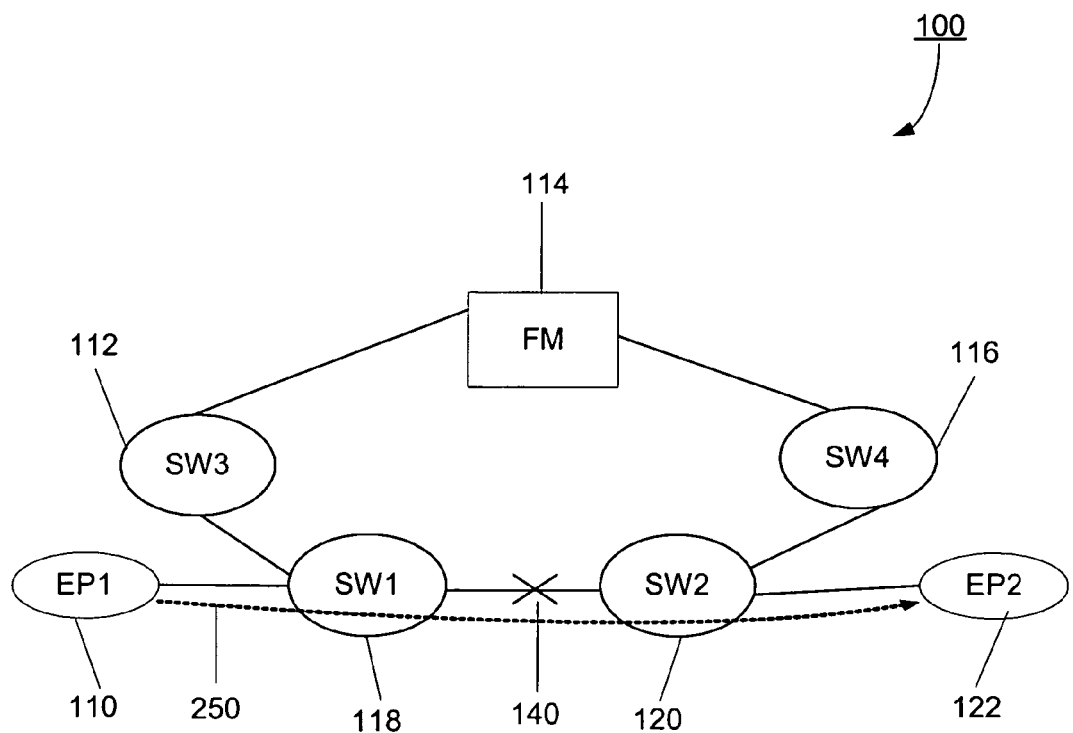
FIG. 2 illustrates an interconnect fabric with a down link between two switches and including two end points with a communication path that includes the down link.

FIG. 2 illustrates an embodiment comprising an interconnect fabric 100 with a down link 140 between two switches and including two end points, endpoint 110 and endpoint 122, with a communication path that includes the down link 140. Generally, FIG. 2 discloses the same interconnect fabric as FIG. 1, but illustrates a different functionality. Namely, FIG. 2 includes data communication path 250 that resides between endpoint 110 and endpoint 122.

Figure 3:
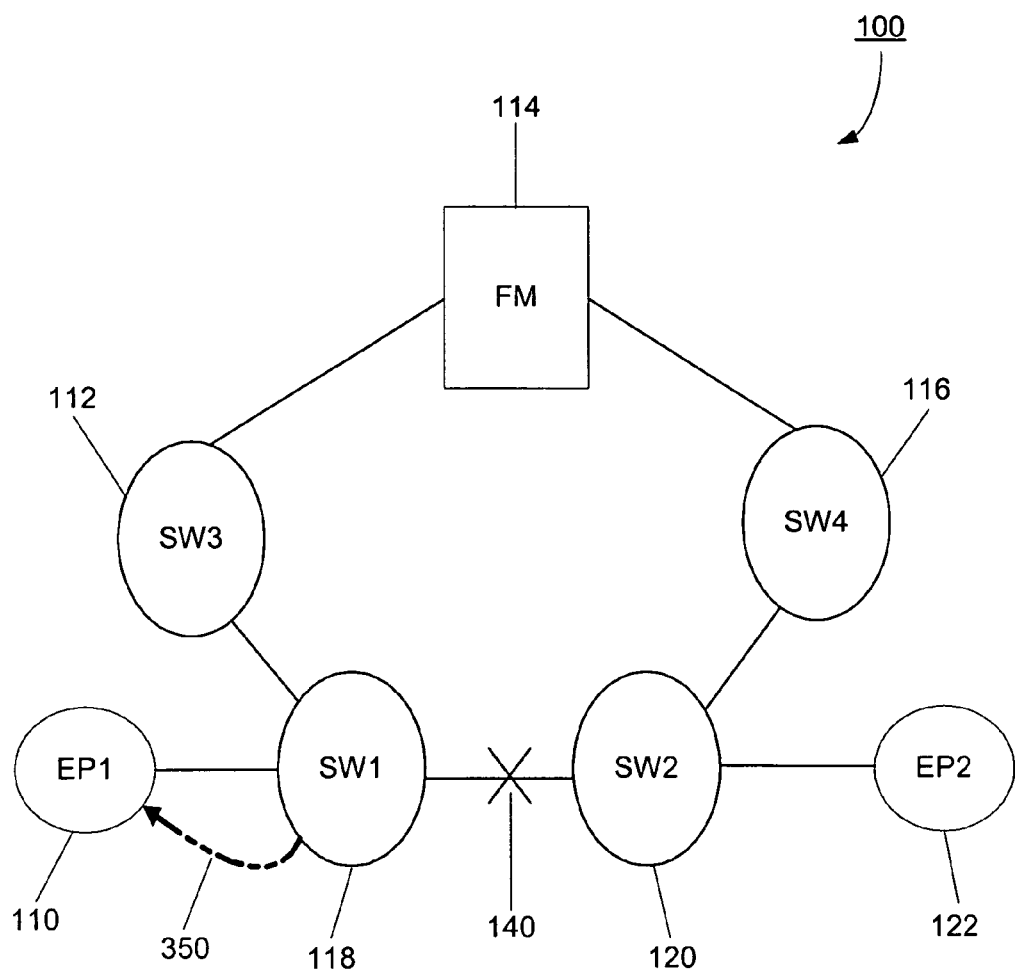
FIG. 3 illustrates an interconnect fabric with a down link between two switches and including end points that may be notified of down link by a switch in a communication path that is adjacent to a down link.

FIG. 3 illustrates an embodiment comprising an interconnect fabric 100 with a down link 140 between two switches, switch 118 and switch 120, and including end points that may be notified of down link 140 by a switch in a communication path that is adjacent to a down link 140. In the present example, switch 118 has detected the down link 140 that connects switch 118 and switch 120. After switch 118 detects the down link 140, it sends a notification to endpoint 110 that the link 140 in the communication path is down. In one embodiment, the notification is a return to sender link down ASI event packet. In the present example the notification to endpoint 110 is in response to a data packet that was endpoint 110 attempted to route through the failed link 140.

Figure 4:
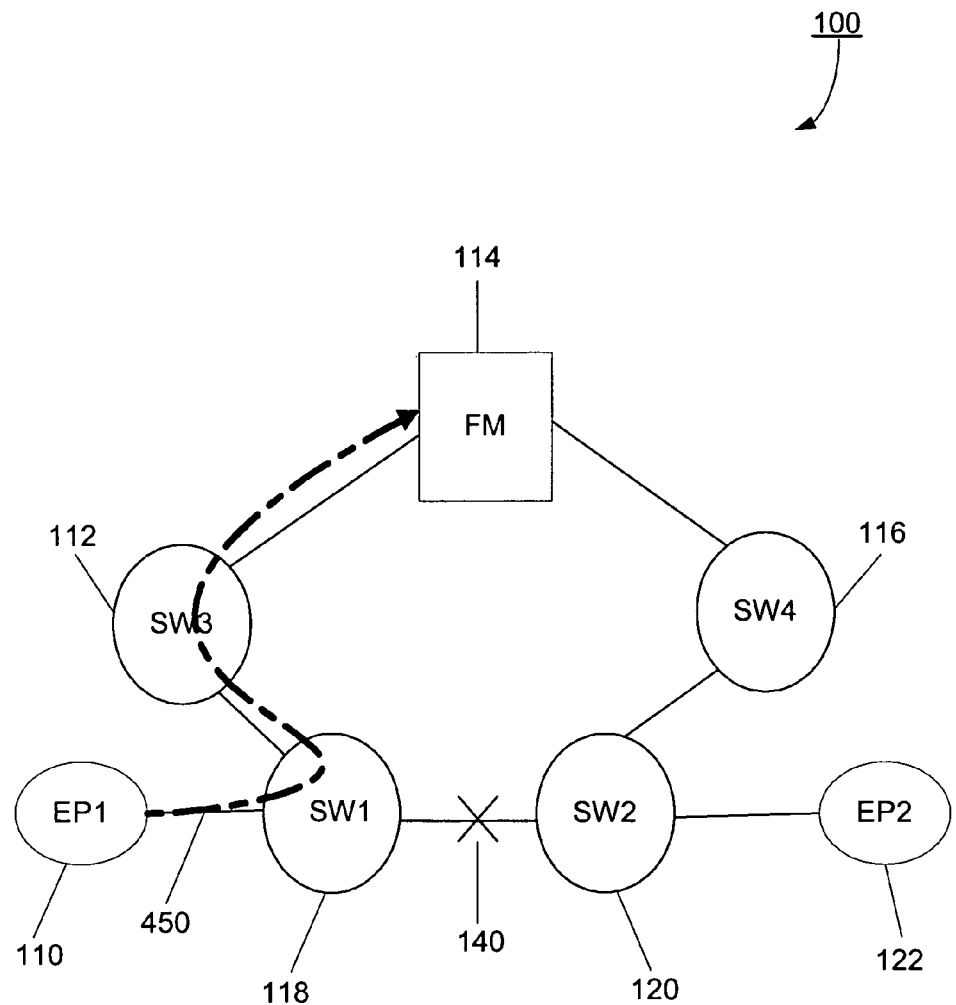
FIG. 4 illustrates an interconnect fabric with a down link between two switches and an end point notifying a fabric manager of a link that is down.

FIG. 4 illustrates an embodiment comprising an interconnect fabric 100 with a down link 140 between two switches, and additionally illustrates an end point 110 notifying a fabric manager 114 of the link 140 that is down. Referring to FIG. 4, endpoint 110 notifies 450 fabric manager 114 that link 140 is down. In the present example, after switch 118 detects the down link 140, and notifies endpoint 110 that the link 140 in the communication path is down, endpoint 110 sends the notification 450 to the fabric manager 114. In one embodiment, the notification is a return to sender link down ASI event packet. In one embodiment, the notification 450 sent from endpoint 110 to fabric manager 114 is a user defined PI packet. In an embodiment, a protocol interface is an interface that conditions the targeted protocol's packets for transmission through an ASI fabric (sometimes called an ASI fabric). In some embodiments, a PI may be either hardware, software, or a combination of both.

An exemplary embodiment may be implemented in an advanced switching fabric (AS). In an ASI fabric, different PI packets are used for inter-device communication. For example, a PI4 packet is generally used for configuration, a PI5 is used for Events; a software PI packet is used for user-defined packets, etc. When an endpoint needs to communicate with another endpoint, it requests a fabric manager (FM) for an optimal route to the destination endpoint. Thereafter, a source endpoint uses this route, for example TurnPool, TurnPointer and Egress port, for data communication with the destination endpoint. When the destination EP stops responding to the packets from the source EP, it could be either due to hardware or software failure in one of the devices en-route. An example hardware failure is a link going down or the device failure. An example software failure involves the software running on a device not functioning properly. An embodiment may detect or find a faulty device, and initiate correction of the problem.

Figure 5:
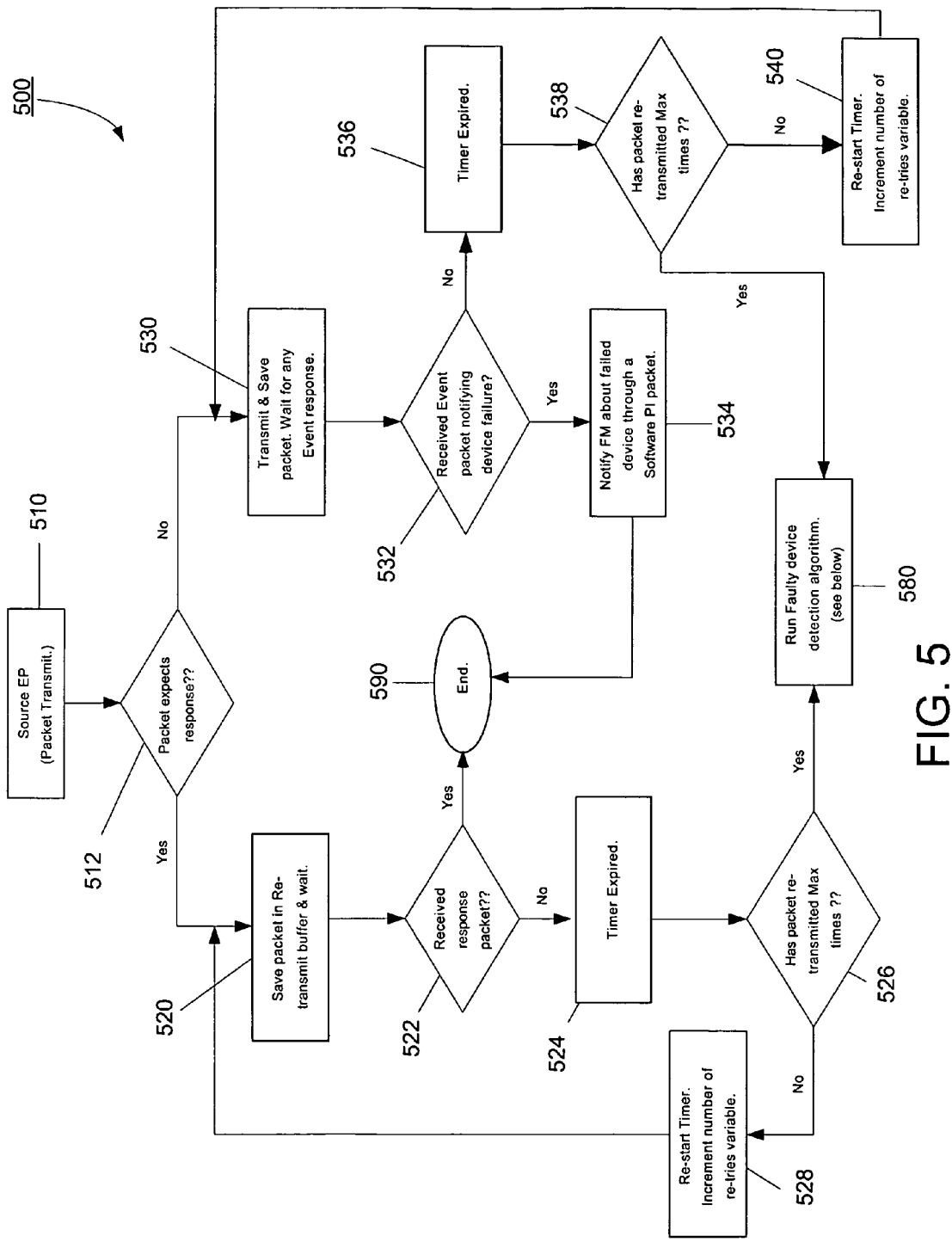
FIG. 5 illustrates a flow diagram of a lost packet handling process.

FIG. 5 illustrates an embodiment flow diagram of a lost packet handling process 500. In an embodiment the lost packet handling process may comprise sending a packet from an endpoint in an advanced switching fabric and starting a timer to run until receiving a response packet or receiving an event packet notifying of a device failure, saving a copy of the sent packet, detecting if the timer has expired, retransmitting the packet after the timer has expired and resetting the timer, and running a faulty device detection algorithm if the packet has been retransmitted a predetermined number of times.

In another embodiment the process may further comprise notifying a fabric manager about a failed device if an event packet is received in response to the transmitted packet. In an embodiment, the event packet may be a return to sender port down event packet, wherein the fabric manager is notified with a software Protocol Interface packet. The method may further comprise the fabric manager conducting limited device discovery in response to the failure. In an embodiment, the limited device discovery may be a Baseline Capability read.

In block 510, a source endpoint transmits a packet or other data transmission. In an embodiment the process may proceed at an endpoint such as the source endpoint at 510. After the data or packet transmission, lost packet handling process 500 determines if a response is expected for the transmitted packet in block 512. Based on the result of block 512, the process 500 branches into two major flows.

If at block 512 the process 500 does expect a response to the packet transmitted in block 510, the process flows to block 520 where the transmitted packet is saved in a retransmit buffer. At block 520 the process may enter a state of waiting. After block 520 the process branches at block 522 based on if a response packet has been received. It a response packet is received, process 500 flows to end block 590.

Figure 6:
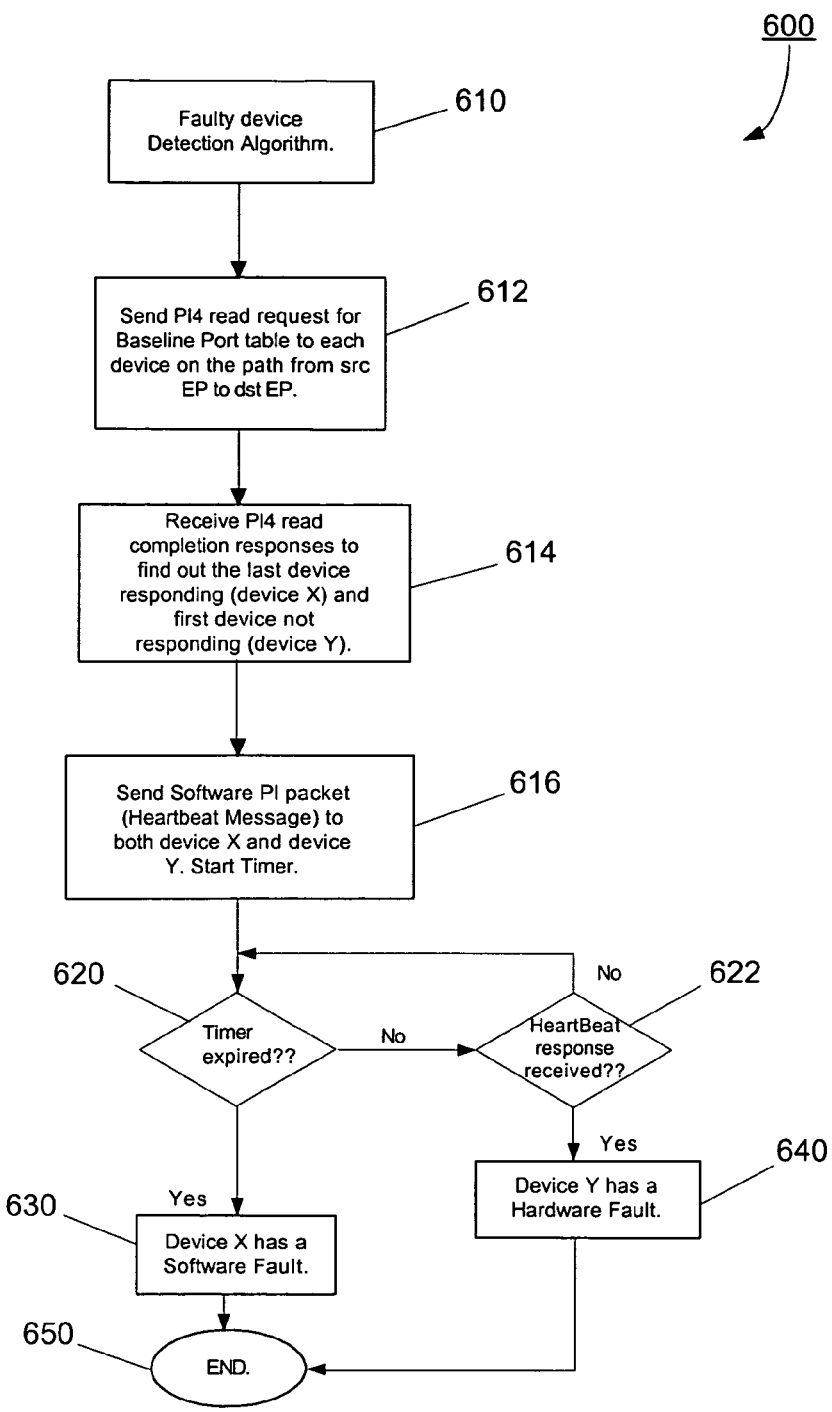
FIG. 6 illustrates a flow diagram of a faulty device detection sequence.

Considering a response packet has not been received at block 522, the process flows to block 524 until a timer expires. After block 524 the process 500 determines if the packet has been retransmitted a threshold number of times. If the packet has not been retransmitted the threshold amount of times, process 500 flows to block 528 where it restarts the timer and increments a variable designating the number of retransmissions of the packet. After block 528, the process flows back into block 520 to begin the timer loop. If, in response to block 526, the packet has been retransmitted a threshold number of times, the process 500 flows to block 580 and runs a faulty device detection process or algorithm, an example of which is illustrated in FIG. 6.

If a packet does not expect a response at block 512, the process 500 flows to block 530 where the packet is transmitted and waits for any event response. If an event packet is received notifying the process 500 of an device failure, then at block 534 a fabric manager 114 is notified about the failed device. An exemplary way to notify the fabric manager 114 is through a software PI packet. After the fabric manager 114 is notified, the process may terminate at block 590.

If an event packet notifying an event failure is not received at the branch in decision block 532, after timer expiration in block 536, the process 500 determines if the packet has been transmitted a threshold number of times and if so, it runs a faulty device detection process or algorithm at block 580. If a packet has not been retransmitted a threshold number of times at block 538, the timer is restarted at block 540, and increments a variable designating the number of retransmissions of the packet. After the timer is restarted at 540, the timer expiry loop begins again at block 530.

An embodiment may include a timer expiry routine. For example, if a packet could not transmit due to a hardware failure, a source device may request a FM for an alternate path which does not go from the device that has failed. Subsequently, a source EP may use a new path to transmit packets to a destination device. While this is happening, an embodiment FM can perform recovery action from the failed device scenario by doing arbitration.

An embodiment may be an apparatus comprising a retransmit buffer, and an endpoint coupled to the retransmit buffer, the endpoint to send a packet to an advanced switching fabric, save a copy of the packet in the retransmit buffer, detect if a timer expired since the packet was sent if no packet is received in response to the transmitted packet, retransmit the packet after the timer has expired and no packet was received in response to the transmitted packet, and run a faulty device detection algorithm if the packet has been retransmitted a predetermined number of times. In the present embodiment, the endpoint may be endpoint 110 or endpoint 122 as illustrated in FIG. 1.

In the present embodiment, the endpoint may notify a fabric manager about a failed device if an event packet is received in response to the transmitted packet. In some embodiments, the event packet may be a return to sender port down event packet. In yet another embodiment, the fabric manager may be notified with a software Protocol Interface packet.

Some embodiments may be a system comprising a retransmit buffer, an endpoint coupled to the retransmit buffer, the endpoint to send a packet to an ASI fabric, save a copy of the packet in the retransmit buffer, detect if a timer expired since the packet was sent if no packet is received in response to the transmitted packet, retransmit the packet after the timer has expired and no packet was received in response to the transmitted packet, and run a faulty device detection algorithm if the packet has been retransmitted a predetermined number of times, and a fabric manager in an advanced switching fabric, the fabric manager to conduct limited device discovery in response to a failure.

In some embodiments, the limited device discovery may be a baseline capability read. In some embodiments, the faulty device detection algorithm may be to send a request to each device in a path in an ASI fabric, receive a response from operational devices in the path, and detect a fault in the path if a device in the path does not respond. Furthermore, in some embodiments the request may be a Protocol Interface 4 read request for a Baseline port table. In yet another embodiment, the response may be a Protocol Interface 4 read completion response.

Some embodiment systems may further comprise an endpoint to send a message to the last operational device in the path and the first non-operational device in the path. The endpoint may be an endpoint as discussed above. In the present embodiment, the message may be a Software Protocol Interface packet. In another embodiment system, a hardware failure of the first non-operational device may be detected if a response to the message is received and a software failure of the last operational device in the path is detected if no response to the message is received. Some embodiments may address lost link down events in advanced switching interconnects.

FIG. 6 illustrates an embodiment flow diagram of a faulty device detection sequence 600. In some embodiments, performing a faulty device detection may comprise sending a request to each device in a path in an Advanced Switching fabric, receiving a response from operational devices in the path, and detecting a fault in the path if a device in the path does not respond.

An embodiment have functionality to find a faulty device. For example, when a packet does not reach a device after a certain number of tries, a timer for that packet may expire. In an embodiment a timer expiry routine may send a message to all the devices in the path to the destination. In an ASI embodiment, this message may be a PI4 read packet. Some embodiments may then collect the responses to analyze which device is faulty. The earliest device in the path for which read completion packet was not received may be declared faulty.

In some embodiments, if a read completion packet is received for one device, for example device X, but it is not received for the very next device, for example device Y, it could be determined that either device X has software fault or device Y has hardware fault.

An embodiment may isolate these two potential faults by sending a message to the first device and then observe if and how a response is received. In one embodiment the message is a software PI packet (HeartBeat). To use the present embodiment as an example, if a response to the HeartBeat packet is received, it implies device X is running and device Y had a hardware fault. If no response is received and a timeout happens, the fault is likely a software fault on device X.

An embodiment may notify the FM which may then remove the failed device from the fabric. An embodiment may further read a baseline capability of a node declared non-operational and determine a status of this device as well as other devices connected to it.

At block 610, a faulty device detection process is triggered. After the process is started, at block 612 a request is sent to each device on the path. In an embodiment, the request is a PI4 read request for a baseline port table and it is sent to each device on the path from a source endpoint to a destination endpoint. In an embodiment, the source endpoint may be endpoint 110 in FIG. 1 and the destination endpoint may be endpoint 122 in the same figure.

At block 614, responses are received from each functioning device and in response to the request sent out in block 612.

In an embodiment the response is a PI4 read completion response. Referring to block 614, the process may determine both the farthest device along the path that is functioning, the last device responding, as well as the first device that is not responding.

At block 616, following receiving the response or responses in block 614, a message may be sent to both the last device responding and the first device not responding. In an embodiment the message may function as a heartbeat message. In this embodiment a software PI packet may be sent to both the last responding device and the first device not responding. Additionally, at block 616 a timer may be started.

At block 620, a query is made to see if the timer has expired and if not, it begins a loop through block 622 to see if a heartbeat response is received. If the response is not received, the process 600 flows back through branch block 620. When the timer has expired at block 620, the process flow branches to block 630 and it is determined that the last responding device has a software fault. If a heartbeat response is received at block 622, the process flow branches to block 640 where it is determined that the first device not responding in block 614 has a hardware fault, and the faulty device detection sequence can terminate at block 650.

In some embodiments, the request may be a Protocol Interface 4 read request for a Baseline port table. In another embodiment, the response may be a Protocol Interface 4 read completion response. One embodiment may further comprise sending a message to the last operational device in the path and the first non-operational device in the path. In the present embodiment, the message may be a Software Protocol Interface packet. Some embodiments may determine a hardware failure of the first non-operational device if a response to the message is received and a software failure of the last operational device in the path if no response to the message is received.

Figure 7:
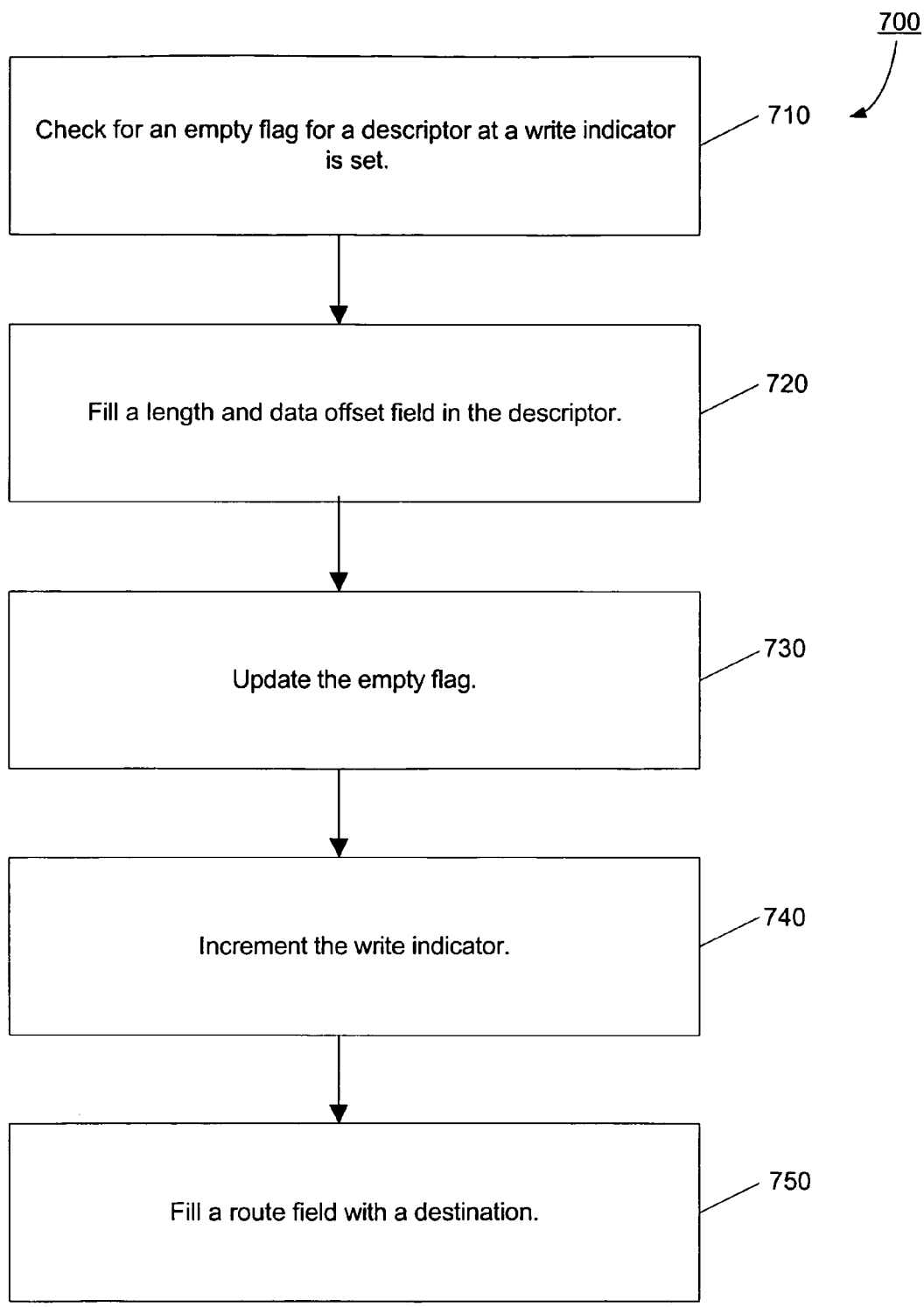
FIG. 7 illustrates a flow diagram of a method for lost Link Down events and detection.

FIG. 7 illustrates a flow diagram of a method 700 for lost Link Down events and detection. In block 710, a device checks for an empty flag for a descriptor at a write indicator is set. In block 720, a device fills a length and data offset field in the descriptor. In block 730, the device updates the empty flag. In block 740, the device increments the write indicator. In block 750, the device rills a route field with a destination.

Figure 8:
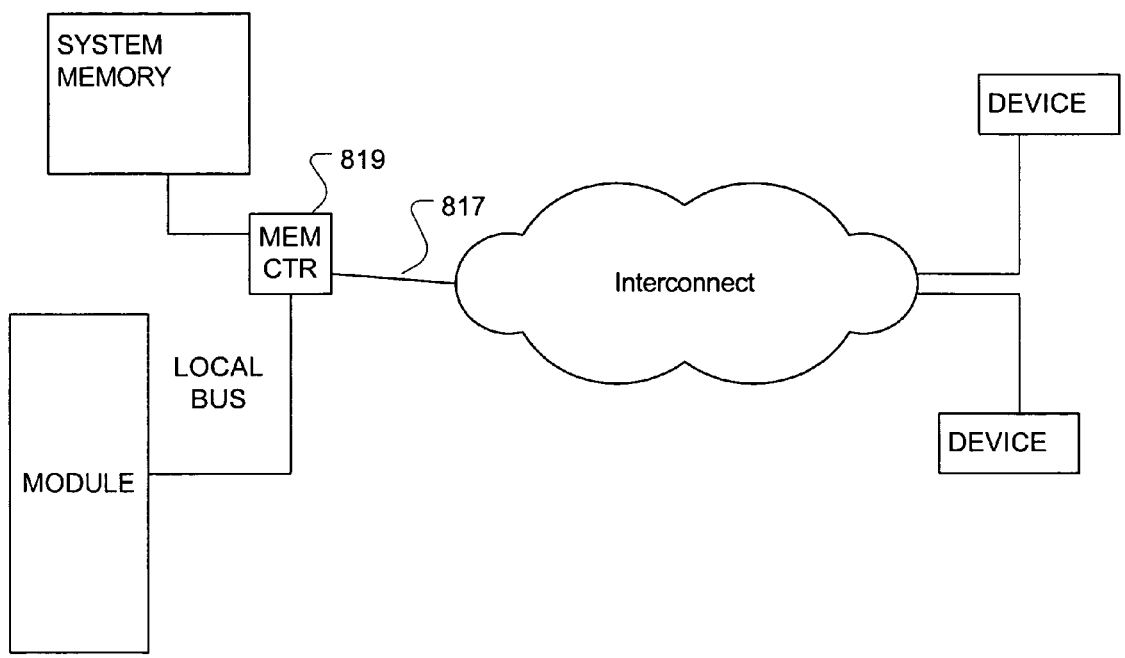
FIG. 8 illustrates an embodiment apparatus to conduct the process for link down event detection and handling.

FIG. 8 illustrates an embodiment apparatus to conduct the process as disclosed above. Referring to FIG. 8, a link 817 may couple a memory controller 819 through an interconnect to other devices. The memory controller may have a local bus to a processing device, such as a central processing unit or any other device capable of processing instructions or data. The memory controller 819 may also be coupled with a system memory. The embodiment in FIG. 8 is an example of an apparatus that may execute instructions and perform processes as disclosed herein, but the invention is not so limited, any device with hardware having respective characteristics of the other examples in this description and an ability to process instructions, may satisfy the same role.

Some embodiments may be an article of machine-readable medium containing instructions that, when executed, cause a machine to send a packet from an endpoint in an advanced switching fabric and start a timer to run until receiving a response packet or receiving an event packet notifying of a device failure, save a copy of the sent packet, detect if the timer has expired, retransmit the packet after the timer has expired and resetting the timer, and run a faulty device detection algorithm if the packet has been retransmitted a predetermined number of times.

The present embodiment may further contain instructions that, when executed, cause a machine to notify a fabric manager about a failed device if an event packet is received in response to the transmitted packet. In some embodiments, the event packet may be a return to sender port down event packet. Furthermore, in some embodiments, a fabric manager may be notified with a software Protocol Interface packet. Embodiments may further contain instructions that, when executed, cause a fabric manager to conduct limited device discovery in response to the failure, such as a baseline capability read in an ASI fabric. An example ASI fabric may resemble the fabric in FIG. 1.

In an ASI fabric, every endpoint may generate various PI (PI4, Software PI, etc) packets for EP to EP communication. Every EP in the fabric need to account for the PI packets lost during transmission. In ASI network when a device stops responding to the requests, as mentioned above, it could be either due to the hardware or software failure on the device. As disclosed above, a FM may detect a link failure and perform corrective action, however, packets transmitted in the fabric through that down link may get lost. Furthermore, the control packets could get lost in a fabric, or software running on the device could crash. Some embodiments may therefore include a mechanism within each EP device for retransmitting packets through a link and may also include a mechanism for transmitting through an alternate link if a device or link failure is detected.

Some embodiment may account for packets lost due to various activities in an interconnect fabric, such as an ASI fabric. Furthermore, an embodiment may determine a device failure, pin-point the failed device and re-route packets through the fabric. Some embodiments may provide a way for devices in the fabric to detect packets lost. In interconnect fabrics, such as an ASI fabric, various packets transmitted through the fabric can be divided into two categories, packets that expect a response or some form of acknowledgement, and packets that do not expect a response or acknowledgement. An example of a packet that may not expect an acknowledgement is a convention read or write.

An embodiment that has packets with an expected response or acknowledgement may handle both hardware and software faults. A useful example interconnect fabric is the ASI fabric mentioned above. In this example, when an ASI device transmits a packet on a PCI Express link and the packet does not reach its destination device, there could be various reasons associated with the loss of packet. It could be either because the path to the target device is lossy or the software on the target is not responsive, for example, the software has crashed.

One embodiment may store every transmitted packet that expects a response in a re-transmit buffer. In this embodiment, the buffer may be de-allocated either on receipt of a response packet or after attempting a retransmission for a number of times, for example, some predetermined number. If a packet could not be transmitted successfully even after several tries, a timer expiry routine for that module can be triggered and run diagnostic code to find the fault in the fabric.

Once a faulty node is detected, source EP will send a control message, such as a software PI packet in an ASI fabric, to manager to indicate a device failure. In some cases the manager may have already received an event from a device connected to the faulty device. Consequently, a fabric manager should have already removed the device from its graph. On the other hand, if a fabric manager did not receive an event, it may take recovery action, such as perform a limited device discovery on that device and the devices connected to it, as discussed hereinabove.

In an embodiment, after updating a fabric topology, a fabric manager could reply back to the source EP with a new route to reach a destination EP. During this time, all connections between the source EP and the destination EP can be placed in a PAUSE state.

An embodiment that has packets without an expected response or acknowledgement may handle hardware faults due to which an event is generated. In the present embodiment, an event may be generated to indicate hardware failure on any device in the path of this packet. An example may be illustrated with reference to FIG. 1. In this example, a packet is sent from a first endpoint 110 to endpoint 122 through switch 118 and switch 120. If switch 120 has failed and switch 118 could not transmit packet to it, switch 118 may be notified with a link level failure while trying to transmit this packet.

Furthermore, switch 118 may generate an event towards endpoint 110 indicating the failure of switch 120. In an embodiment, the event generate may be a return to sender event indicating the failure. In this example, endpoint 110 may then send a control message, such as a software PI packet, to a FM indicating the failure and even the fact that the failure happened at switch 120.

In the present example, a FM may then initiate device discovery for switch 120 and all other devices connected to it. This will be partial discovery for devices already in the fabric 100. After discovering the latest fabric topology, a manager may send a new path to the original sending device. In one embodiment, a FM may send a path update message to the source EP with a new path to reach the destination EP. In an embodiment, all connections between the source EP and the destination EP may be placed in a PAUSE state during this recovery phase.

Embodiments of the invention may provide a method to send a packet from an endpoint in an advanced switching fabric and starting a timer to run until receiving a response packet or receiving an event packet notifying of a device failure, save a copy of the sent packet, detect if the timer has expired, retransmit the packet after the timer has expired and resetting the timer; and run a faulty device detection algorithm if the packet has been retransmitted a predetermined number of times. Furthermore, some embodiments may provide an apparatus with a retransmit buffer, and an endpoint coupled to the retransmit buffer, where the endpoint can send a packet to an advanced switching fabric, save a copy of the packet in the retransmit buffer, detect if a timer expired since the packet was sent if no packet is received in response to the transmitted packet, retransmit the packet after the timer has expired and no packet was received in response to the transmitted packet, and run a faulty device detection algorithm if the packet has been retransmitted a predetermined number of times.

Another embodiment may be an article of machine-readable medium containing instructions that, when executed, cause a machine to send a packet from an endpoint in an advanced switching fabric and start a timer to run until receiving a response packet or receiving an event packet notifying of a device failure, save a copy of the sent packet, detect if the timer has expired, retransmit the packet after the timer has expired and resetting the timer; and run a faulty device detection algorithm if the packet has been retransmitted a predetermined number of times.

In yet another embodiment, a system may comprise a retransmit buffer and a device coupled to the retransmit buffer, the device to send a packet to an Advanced Switching fabric, save a copy of the packet in the retransmit buffer, detect if a timer expired since the packet was sent if no packet is received in response to the transmitted packet, retransmit the packet after the timer has expired and no packet was received in response to the transmitted packet, and run a faulty device detection algorithm if the packet has been retransmitted a predetermined number of times, and a fabric manager in an advanced switching fabric wherein the fabric manager can conduct limited device discovery in response to a failure.

The present invention may be embodied in other specific forms without departing from its spirit or essential characteristics. The described embodiments are to be considered in all respects only as illustrative instead of restrictive or limiting. Therefore, the scope of the invention is indicated by the appended claims rather than by the foregoing description. All changes, modifications, and alterations that come within the meaning, spirit, and range of equivalency of the claims are to be embraced as being within the scope of the appended claims.

The invention claimed is:

1. A method comprising:
   sending a packet from an endpoint in an advanced switching fabric and starting a timer to run until receiving a response packet or receiving an event packet notifying of a device failure;
   saving a copy of the sent packet;
   detecting if the timer has expired,
   retransmitting the packet after the timer has expired and resetting the timer; and
   running a faulty device detection algorithm if the packet has been retransmitted a predetermined number of times, wherein running the faulty device detection algorithm comprises:
   sending a request to each device in a path in the advanced switching fabric;
   receiving a response from operational devices in the path;
   detecting a fault in the path if a device in the path does not respond; and
   sending a message to the last operational device in the path and the first non-operational device in the path, wherein a hardware failure of the first non-operational device is detected if a response to the message is received and wherein a software failure of the last operational device in the path is detected if no response to the message is received.

2. The method of claim 1 further comprising, notifying a fabric manager about a failed device if an event packet is received in response to the packet.

3. The method of claim 2 wherein the event packet is a return to sender port down event packet.

4. The method of claim 2 wherein the fabric manager is notified with a software Protocol Interface packet.

5. The method of claim 2 further comprising the fabric manager conducting limited device discovery in response to the failure.

6. The method of claim 5 wherein the limited device discovery is a Baseline Capability read.

7. The method of claim 1 wherein the request is a Protocol Interface 4 read request for a Baseline port table.

8. The method of claim 1 wherein the response is a Protocol Interface 4 read completion response.

9. The method of claim 1 wherein the message is a Software Protocol Interface packet.

10. An apparatus comprising a machine-readable medium containing instructions that, when executed, cause a machine to:
   send a packet from an endpoint in an advanced switching fabric and start a timer to run until receiving a response packet or receiving an event packet notifying of a device failure;

save a copy of the packet;
detect if the timer has expired,
retransmit the packet after the timer has expired and resetting the timer; and
run a faulty device detection algorithm if the packet has been retransmitted a predetermined number of times, wherein running the faulty device detection algorithm comprises:
  sending a request to each device in a path in the advanced switching fabric;
  receiving a response from operational devices in the path;
  detecting a fault in the path if a device in the path does not respond; and
  sending a message to the last operational device in the path and the first non-operational device in the path, wherein a hardware failure of the first non-operational device is detected if a response to the message is received and wherein a software failure of the last operational device in the path is detected if no response to the message is received.

11. The apparatus of claim 10 further containing instructions that, when executed, cause a machine to notify a fabric manager about a failed device if an event packet is received in response to the packet.

12. The apparatus of claim 11 wherein the event packet is a return to sender port down event packet.

13. The apparatus of claim 11 wherein the fabric manager is notified with a software Protocol Interface packet.

14. The apparatus of claim 11 further containing instructions that, when executed, cause the fabric manager to conduct limited device discovery in response to the failure.

15. The apparatus of claim 14 wherein the limited device discovery is a Baseline Capability read.

16. An apparatus comprising:
a retransmit buffer; and
an endpoint coupled to the retransmit buffer, the endpoint configured to:
  send a packet to an advanced switching fabric,
  save a copy of the packet in the retransmit buffer,
  detect if a timer expired since the packet was sent if no packet is received in response to the transmitted packet,
  retransmit the packet after the timer has expired and no packet was received in response to the transmitted packet, and
  run a faulty device detection algorithm if the packet has been retransmitted a predetermined number of times, wherein running the faulty device detection algorithm comprises:
    sending a request to each device in a path in the advanced switching fabric;
    receiving a response from operational devices in the path;
    detecting a fault in the path if a device in the path does not respond; and
    sending a message to the last operational device in the path and the first non-operational device in the path, wherein a hardware failure of the first non-operational device is detected if a response to the message is received and wherein a software failure of the last operational device in the path is detected if no response to the message is received.

17. The apparatus of claim 16, wherein the endpoint is further configured to notify a fabric manager about a failed device if an event packet is received in response to the transmitted packet.

18. The apparatus of claim 17 wherein the event packet is a return to sender port down event packet.

19. The apparatus of claim 17 wherein the fabric manager is notified with a software Protocol Interface packet.

20. A system comprising:
a retransmit buffer;
an endpoint coupled to the retransmit buffer, the endpoint configured to:
  send a packet to an Advanced Switching fabric,
  save a copy of the packet in the retransmit buffer,
  detect if a timer expired since the packet was sent if no packet is received in response to the transmitted packet,
  retransmit the packet after the timer has expired and no packet was received in response to the transmitted packet, and
  run a faulty device detection algorithm if the packet has been retransmitted a predetermined number of times, wherein running the faulty device detection algorithm comprises:
    sending a request to each device in a path in the advanced switching fabric;
    receiving a response from operational devices in the path;
    detecting a fault in the path if a device in the path does not respond; and
    sending a message to the last operational device in the path and the first non-operational device in the path, wherein a hardware failure of the first non-operational device is detected if a response to the message is received and wherein a software failure of the last operational device in the path is detected if no response to the message is received; and
a fabric manager in the advanced switching fabric, the fabric manager to conduct limited device discovery in response to a failure,
wherein the endpoint is further configured to request an optimal route to a destination endpoint from the fabric manager and the fabric manager is configured to provide the optimal route.

21. The system of claim 20 wherein the limited device discovery is a Baseline Capability read.

22. The system of claim 20 wherein the request is a Protocol Interface 4 read request for a Baseline port table.

23. The system of claim 20 wherein the response is a Protocol Interface 4 read completion response.

24. The system of claim 20 wherein the message is a Software Protocol Interface packet.

* * * * *